(12) United States Patent
Shaw et al.

(10) Patent No.: US 10,405,055 B2
(45) Date of Patent: *Sep. 3, 2019

(54) APPARATUS AND METHOD FOR MEDIA STREAMING

(71) Applicants: AT&T Intellectual Property I, LP, Atlanta, GA (US); AT&T Mobility II LLC, Atlanta, GA (US)

(72) Inventors: Venson Shaw, Kirkland, WA (US); Jun Shen, Redmond, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,087

(22) Filed: Apr. 22, 2015

(65) Prior Publication Data

US 2015/0230003 A1 Aug. 13, 2015

Related U.S. Application Data

(63) Continuation of application No. 13/455,801, filed on Apr. 25, 2012, now Pat. No. 9,042,441.

(51) Int. Cl.
*H04L 29/06* (2006.01)
*H04N 19/14* (2014.01)
(Continued)

(52) U.S. Cl.
CPC ..... *H04N 21/64769* (2013.01); *H04L 65/602* (2013.01); *H04L 65/80* (2013.01); *H04N 19/115* (2014.11); *H04N 19/14* (2014.11); *H04N 21/2381* (2013.01); *H04N 21/2383* (2013.01); *H04N 21/234363* (2013.01); *H04N 21/64322* (2013.01)

(58) Field of Classification Search
None
See application file for complete search history.

(56) References Cited

U.S. PATENT DOCUMENTS 6,374,288 B1 4/2002 Bhagavath
2002/0131496 A1\* 9/2002 Vasudevan ......... H04N 21/2402
375/240.11

(Continued)

*Primary Examiner* — Mohammed S Rahaman
(74) *Attorney, Agent, or Firm* — Guntin & Gust, PLC; Jay H. Anderson

(57) ABSTRACT

A system that incorporates teachings of the subject disclosure may include, for example, dividing a media content item into a plurality of media content segments, at each media content segment of the plurality of media content segments, applying motion estimation between at least two video frames of the media content segment to determine a content weight for the media content segment, determining a bit rate for the media content segment according to the determined content weight for the media content segment, and encoding the media content segment at the determined bit rates to generate a data stream for the media content segment, whereby a plurality of data streams for the plurality of media content segments of the media content are generated, and transmitting the plurality of data streams for the plurality of media content segments of the media content to the one or more media devices. Other embodiments are disclosed.

20 Claims, 6 Drawing Sheets

(51) Int. Cl.
*H04N 19/115* (2014.01)
*H04N 21/643* (2011.01)
*H04N 21/647* (2011.01)
*H04N 21/2343* (2011.01)
*H04N 21/2381* (2011.01)
*H04N 21/2383* (2011.01)

(56) References Cited

U.S. PATENT DOCUMENTS

| | | | |
|---|---|---|---|
| 2004/0120411 A1* | 6/2004 | Walton | H04B 7/0417 375/260 |
| 2005/0122999 A1* | 6/2005 | Scherzer | H04L 1/02 370/480 |
| 2006/0171457 A1 | 8/2006 | DeGarrido | |
| 2006/0204113 A1 | 9/2006 | Wang et al. | |
| 2006/0222078 A1* | 10/2006 | Raveendran | H04N 21/2365 375/240.16 |
| 2007/0204067 A1 | 8/2007 | Walker et al. | |
| 2008/0025211 A1* | 1/2008 | Karaoguz | H04N 19/89 370/229 |
| 2008/0165861 A1 | 7/2008 | Wen et al. | |
| 2008/0201748 A1* | 8/2008 | Hasek | H04N 7/17309 725/98 |
| 2010/0014528 A1* | 1/2010 | Amir | H04L 45/04 370/400 |
| 2010/0189183 A1 | 7/2010 | Gu et al. | |
| 2010/0272173 A1 | 10/2010 | Puri et al. | |
| 2011/0030019 A1 | 2/2011 | Ulm et al. | |
| 2011/0179186 A1* | 7/2011 | Li | H04L 65/4084 709/231 |
| 2012/0195369 A1 | 8/2012 | Guerrero | |

\* cited by examiner

APPARATUS AND METHOD FOR MEDIA STREAMING

CROSS-REFERENCE TO RELATED APPLICATIONS

This application is a Continuation of and claims priority to U.S. patent application Ser. No. 13/455,801, filed Apr. 25, 2012. The contents of each of the foregoing is/are hereby incorporated by reference into this application as if set forth herein in full.

FIELD OF THE DISCLOSURE

The subject disclosure relates generally to media content and more specifically to an apparatus and method for video streaming.

BACKGROUND

Media content is frequently experienced by consumers via devices such as computers, televisions, radios, and mobile electronics. Media content is frequently delivered by service providers, who send the media content, such as television, radio, and video programming, directly to consumers for enjoyment at their physical locations. Modern communication networks benefit from interconnectivity between consumers and various communication devices. As network capabilities expand, these interconnections provide new opportunities to enhance abilities to enjoy media content.

BRIEF DESCRIPTION OF THE DRAWINGS

Reference will now be made to the accompanying drawings, which are not necessarily drawn to scale, and wherein.

DETAILED DESCRIPTION

Figure 1:
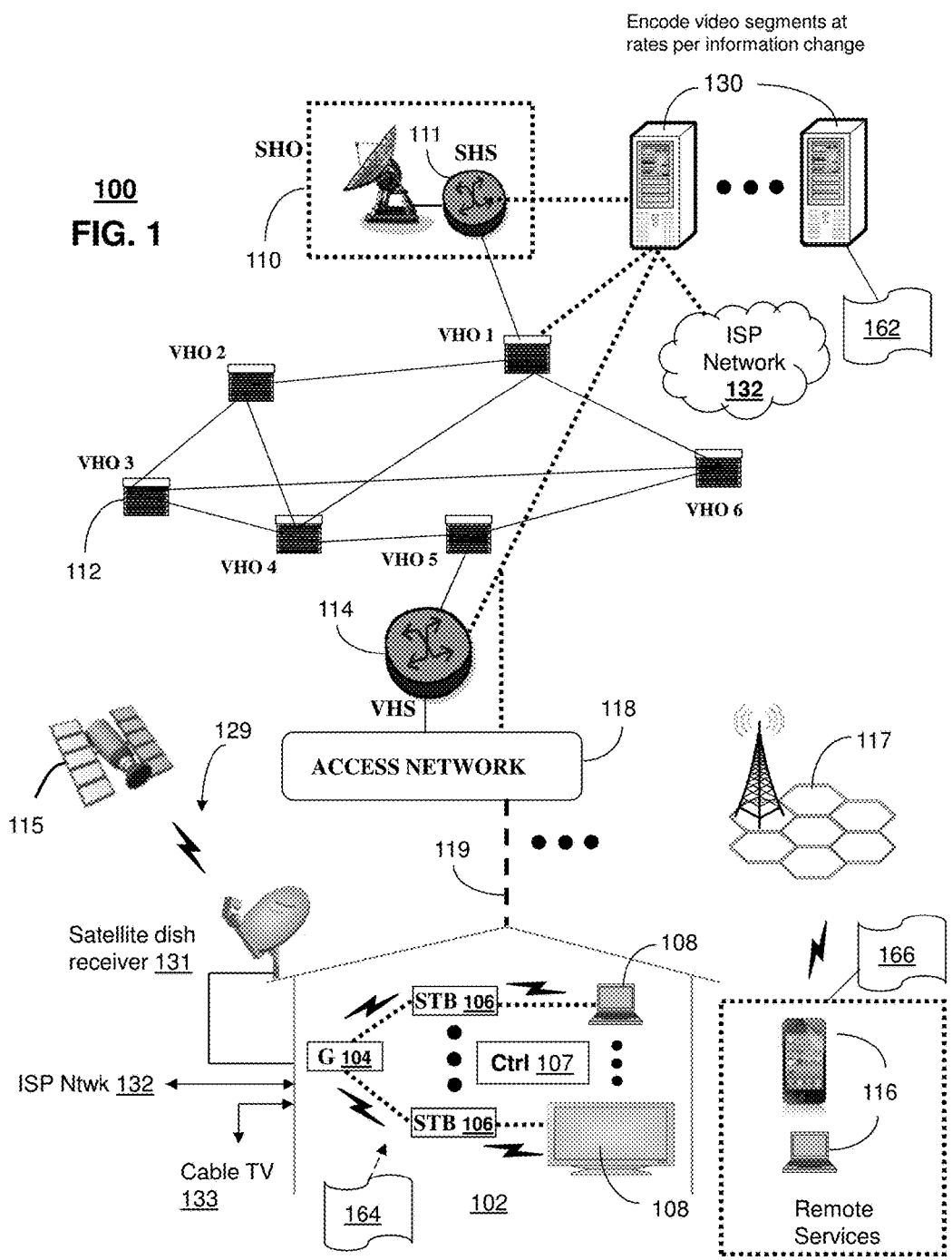
FIGS. 1-2 depict illustrative embodiments of communication systems that provide media services.

The subject disclosure describes, among other things, illustrative embodiments of a system and a method of streaming media content, where the streamed media content is encoded at bit rates according to the content weight of the media content. Other embodiments are contemplated by the subject disclosure.

One embodiment of the subject disclosure includes a memory storing computer instructions and a processor coupled to the memory. The processor can perform operations responsive to executing the computer instructions including receiving media content for distribution to one or more media devices. The processor can perform operations for dividing the received media content into a plurality of media content segments. For each media content segment of the plurality of media content segments, the processor can perform operations for determining a content weight for the media content segment from motion estimation between at least two video frames of the media content segment, for determining a bit rate for the media content segment according to the determined content weight for the media content segment, and for encoding the media content segment at the determined bit rate for the media content segment to generate a data stream for the media content segment. A plurality of data streams for the plurality of media content segments of the media content can thereby be generated. The processor can, in turn, perform operations for transmitting the plurality of data streams for the plurality of media content segments of the media content to the one or more media devices.

One embodiment of the subject disclosure includes computer instructions, which, responsive to being executed by at least one processor, can cause the at least one processor to perform operations including dividing media content into a plurality of media content segments. For each media content segment of the plurality of media content segments, the computer instructions can cause the at least one processor to perform operations for determining a content weight for the media content segment, for determining a bit rate for the media content segment according to the determined content weight for the media content segment, and for encoding the media content segment at the determined bit rate for the media content segment to generate a data stream for the media content segment. A plurality of data stream for the plurality of media content segments can thereby be generated. The computer instructions can cause the at least one processor to perform operations for transmitting the plurality of data streams for the plurality of media content segments of the media content to one or more media devices over a plurality of data channels. The computer instructions can, in turn, cause the at least one processor to perform operations for switching the plurality of data streams between the plurality of data channels according to at least one determined bit rate for at least one media content segment of the plurality of media content segments.

One embodiment of the subject disclosure includes a method including utilizing a system including at least one processor for dividing a media content item into a plurality of media content segments. At each media content segment of the plurality of media content segments, the system can be utilized for applying motion estimation between at least two video frames of the media content segment to determine a content weight for the media content segment, determining a bit rate for the media content segment according to the determined content weight for the media content segment, and encoding the media content segment at the determined bit rates to generate a data stream for the media content segment. A plurality of data streams for the plurality of media content segments of the media content can thereby be generated. The system can, in turn, be utilized for transmitting the plurality of data streams for the plurality of media content segments of the media content to the one or more media devices.

FIG. 1 depicts an illustrative embodiment of a first communication system 100 for delivering media content. The communication system 100 can represent an Internet Protocol Television (IPTV) media system. Communication system 100 can also provide for all or a portion of the computing devices 130 to function as a media server (herein referred to as media server 130). The media server 130 can use computing and communication technology to perform function 162, which can include among things, receive media content from, for example, the super headend office server 111 for distribution through the system 100. The media server 130 can divide the received media content into one or more media content segments. The media server 130 can then determine content weights for each of the media content segments, where the content weights correspond to levels of relative information change within each of the media content segments. The media server 130 can encode the media content segments, where each of the media content segments is encoded at a bit rate according to the content weight for that media content segment. The media server 130 can then transmit the encoded media content segments one or more data streams to media devices by way of an access network 118, where the media devices can include media processors 106 and wireless communication devices 116. The media server 130 can further switch the transmission of data stream to different data channels within the access network 118 according to the bit rates of the encoded media content segments. The media processors 106 and wireless communication devices 116 can be adapted with software functions 164 and 166, respectively, to utilize the services of media server 130.

The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system. Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
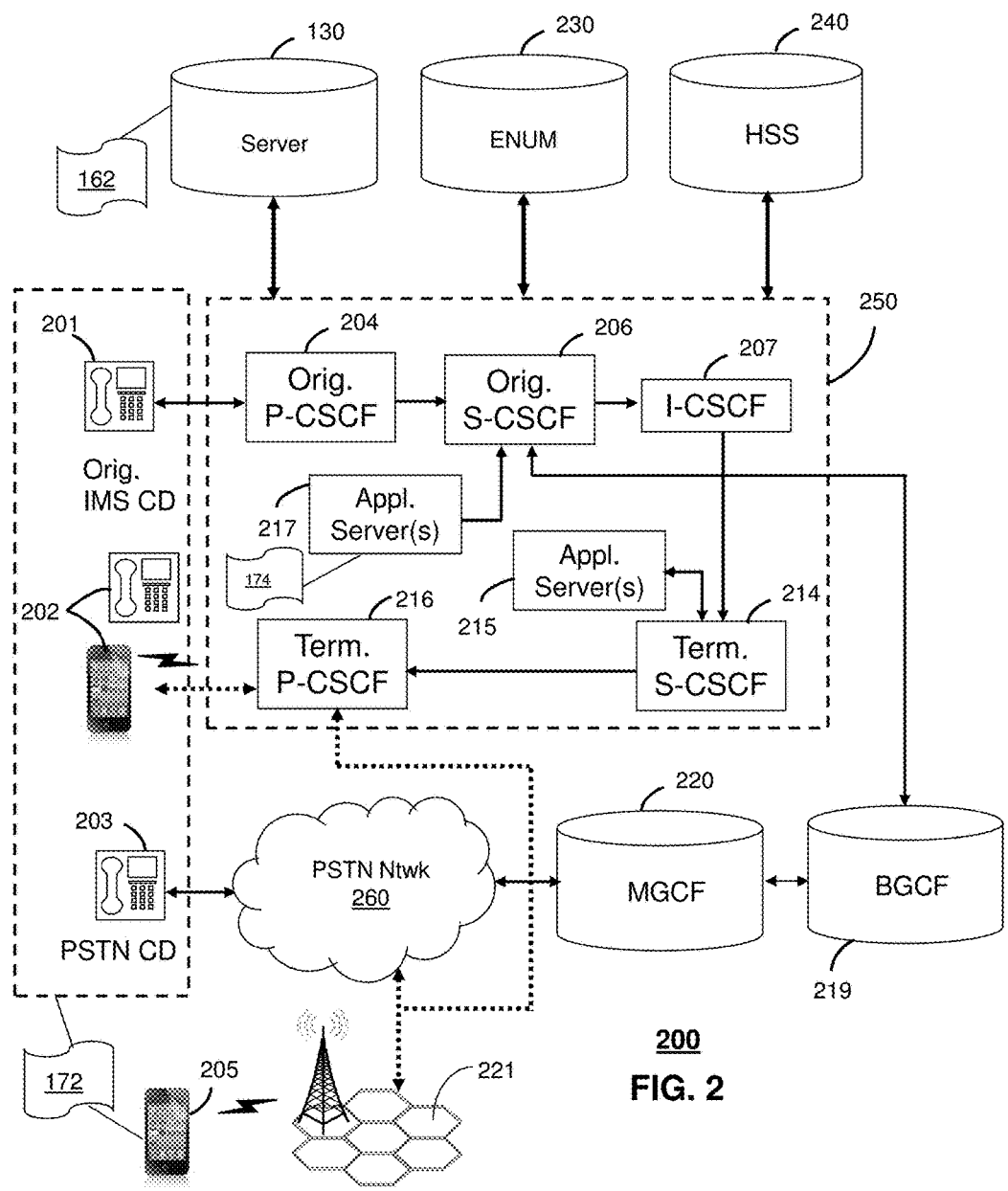

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (EMU) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the EMU system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the EMU system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and EMU server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 1 can be operably coupled to the second communication system 200 for purposes similar to those described above. It is further contemplated by the subject disclosure that media server 130 can perform function 162 and thereby provide streaming media content services to the CDs 201, 202, 203 and 205 of FIG. 2. CDs 201, 202, 203 and 205, which can be adapted with software to perform function 172 to utilize the services of the media server 130. It is further contemplated that the media server 130 can be an integral part of the application server(s) 217 performing function 174, which can be substantially similar to function 162 and adapted to the operations of the IMS network 250.

Figure 3:
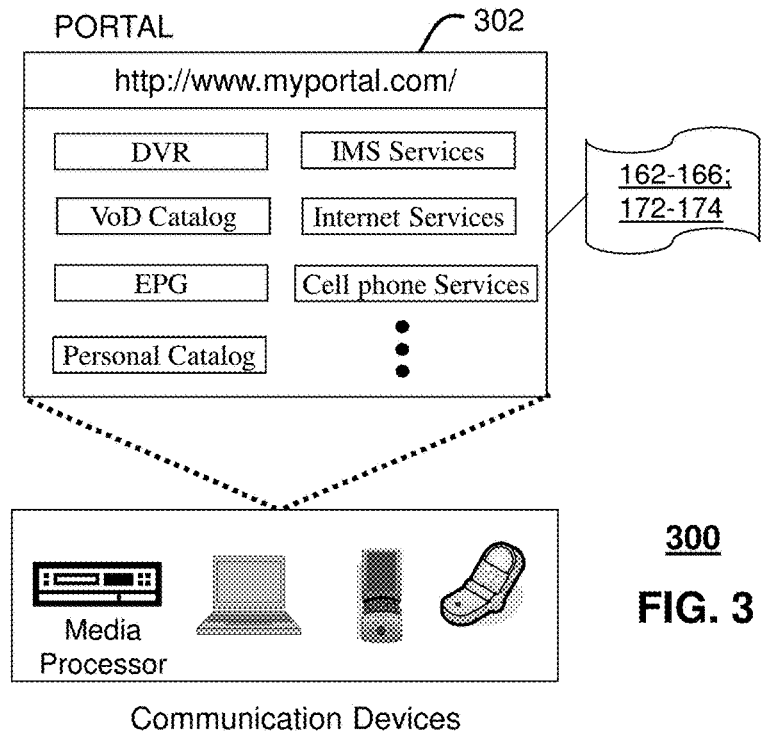
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174, such as transmitting and/or receiving streamed media content, and to adapt these applications as may be desired by subscribers and service providers of communication systems 100-200.

Figure 4:
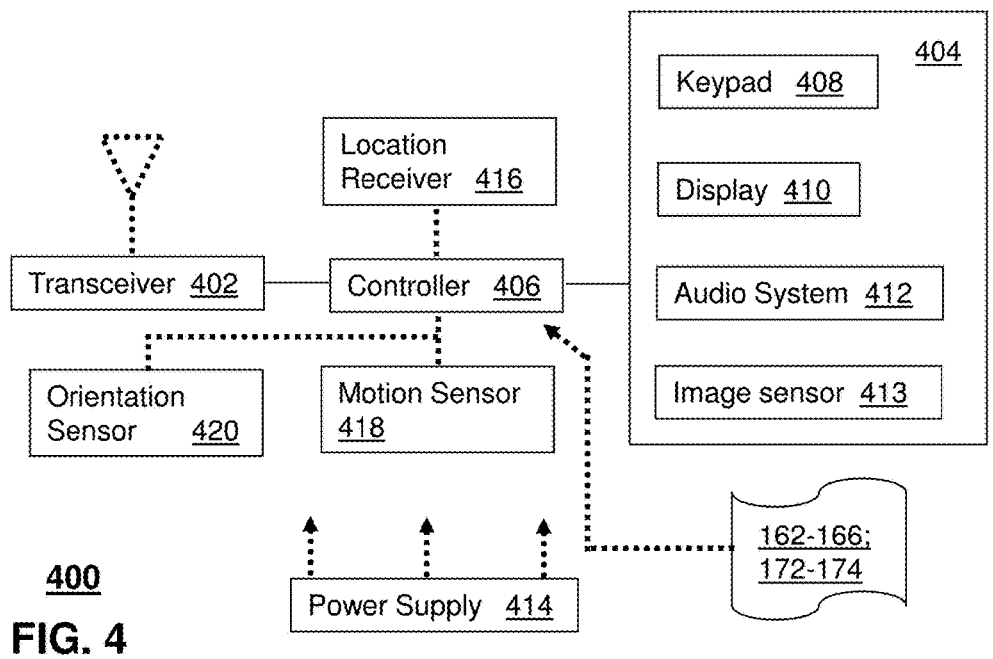
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, such as transmitting and/or receiving streamed media content.

Figure 5:
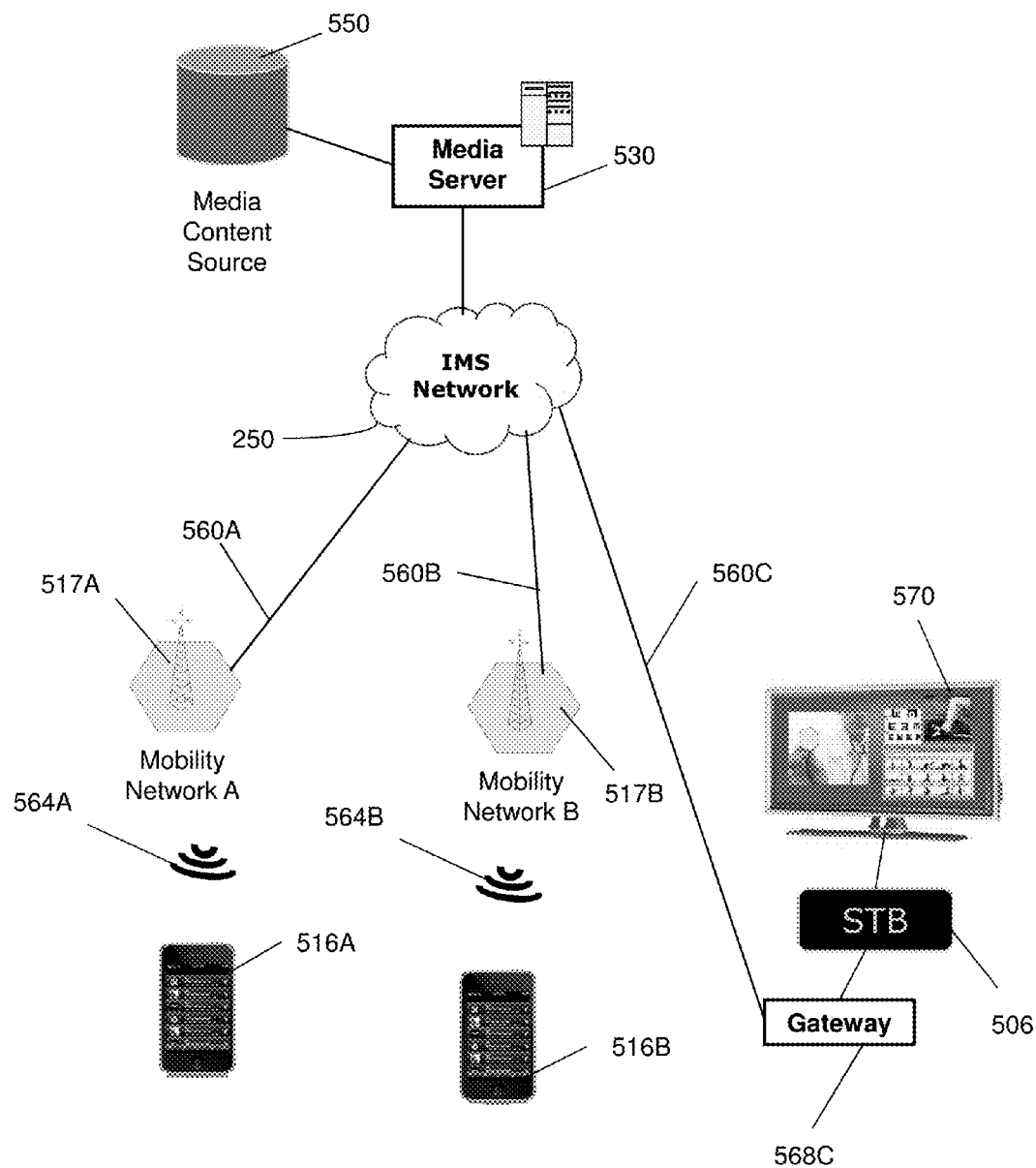
FIG. 5 depicts an illustrative embodiment of a communication system that performs streaming of media content.

FIG. 5 depicts an illustrative embodiment of a communication system 500 for providing media content. System 500 can be overlaid or operably coupled to communication systems 100-200 as another representative embodiment of communication systems 100-200. System 500 can include a media server 530 in communication with a packet switched network such as IMS network 250. The media server 530 can be in communication with a media processor 506, such as set-top box, that is further in communication with a media device 570, such as a television. The media server 530 can provide media content, by way of a media stream, to the media processor device 506. The media processor device 506 can further be in communication with mobile communication device 516A and 516B. The mobile communication devices 516A and 516B can be communicatively coupled to the IMS network 250 through base station 517A of a mobility network A and base station 517B of mobility network B. The mobility communication device 516A and 516B can communicate to the mobility network through a cellular communication technology link 545. The mobile communication devices 516A and 516B can receive streamed media content from the media server device 530 through the IMS network 250 and the mobility networks 517A and 517B.

The media server 530 can receive media content from a media content source 550. The media server 530 can divide the received media content into one or media content segments. The media server 530 can determine content weights for each of the media content segments, where the content weights correspond to levels of relative information change within each of the media content segments. The media server 530 can encode the media content segments, where each of the media content segments is encoded at a bit rate according to the content weight for that media content segment. The media server 530 can transmit the encoded media content segments as one or more data streams to media devices by way of an IMS network 250, where the media devices can include media processors 506 and mobile communication devices 516A and 516B.

The media server 530 can switch the transmission of data streams to different data channels according to the bit rates of the encoded media content segments. For example, mobile communication device 516A can be coupled to the media server 530 by way of data link 560A, mobility network A 517A, and wireless link 564A. Similarly, mobile communication device 516B can be coupled to the media server 530 by way of data link 560B, mobility network B 517B, and wireless link 564B. Media processor device 506 can be coupled to the media server 530 by way of data link 560C and gateway 568C. The data links 560A, 560B, and 560C, each can be made up of one or more data channels capable of transmitting streamed media content sourced from the media server 530 to the media devices 516A, 516B, and 506.

The media server 530 and/or the IMS network 250 and/or mobility networks 517A and 517B can switch data streams between data channels within the data links based on the encoded bit rate of the data stream. In one embodiment, individual data channels within the data links, such as within data link 560A, have different bandwidth capabilities. In another embodiment, individual data channels will experience different bandwidth loading as the data channels are used to communication information for several different devices, such as where the IMS network 250 is communicating with several different devices through the data link 560A and the mobility network A 517A. As the media server 530 encodes requested media content at various bit rates at different segments of the media content in response to variations in the media content weight, this streamed media content from the media server will exhibit corresponding changes in bit rate. For example, during an action sequence of a media program, the media server 530 may detect a high content weight in a segment of the media program—indicating a large amount of variation in video image—and, in response, encode the media content at a high bit rate or, alternatively, a low compression rate. The media server 530 can then stream this encoded media segment at a high bit rate to the receiving device, such as the mobile communications device 516A, over the data link 560A and mobility network A 517A. Some of the data channels of the data link 560A and/or the mobility network A 517A can be capable of carrying the high bit rate stream of the encoded segment due to higher inherent bandwidth or due to lower temporal loading conditions, while other data channels of the data link 560A and/or the mobility network A 517A can be incapable of carrying the high bit rate segment. The media server 530 and/or IMS Network 250 and/or the mobility network A 517A can switch the high bit rate data stream between data channels of to compensate for loading conditions and/or inherent data channel limitations. The media server 530 can thereby provide streaming media content to the mobile communication devices 516A and 516B and to the media processor device 506 according to the illustrative embodiments of method 600 of FIG. 6.

Figure 6:
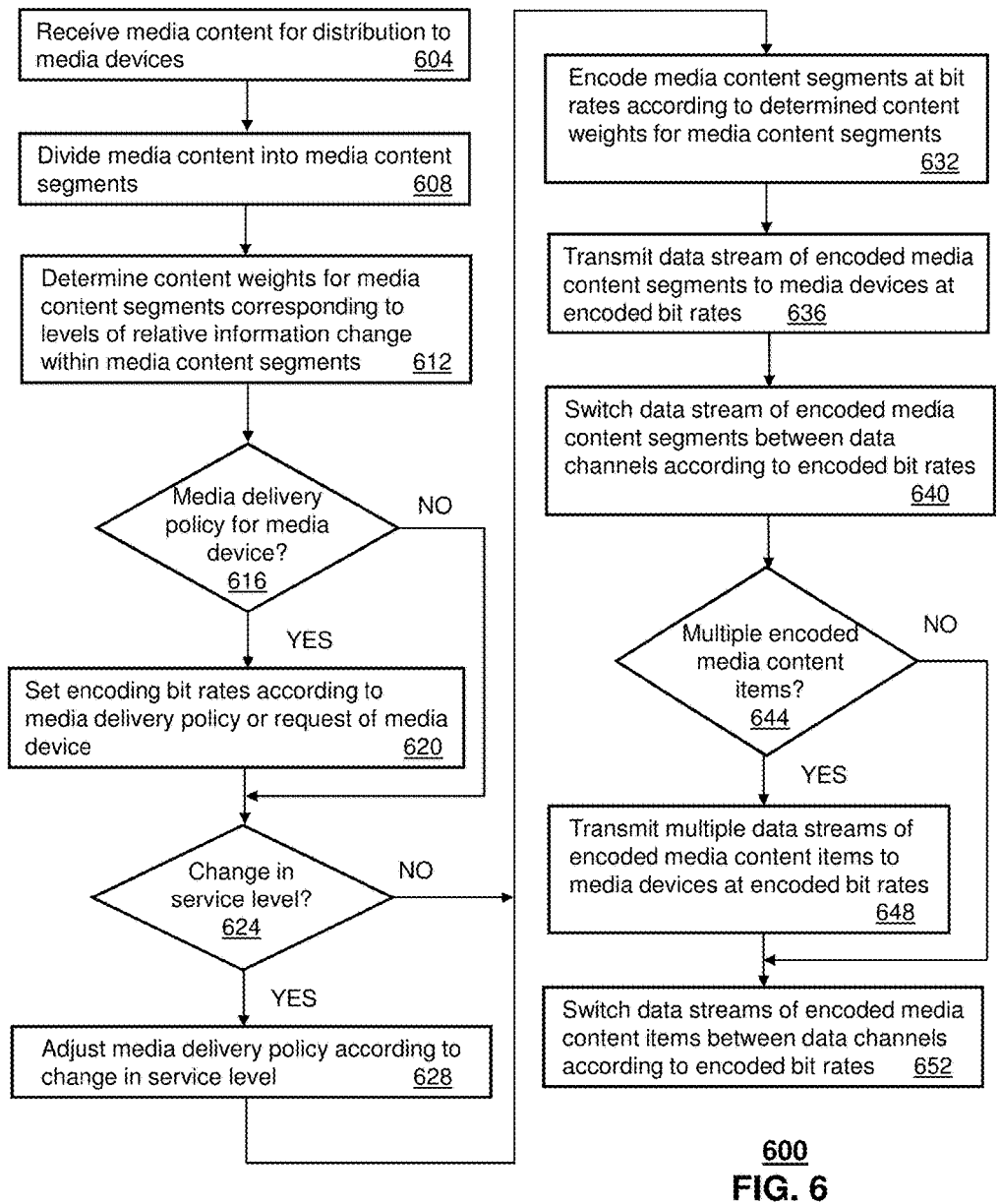
FIG. 6 depicts an illustrative embodiment of a method operating in portions of the systems described in FIGS. 1-5.

FIG. 6 depicts an illustrative method 600 that operates in portions of the devices of FIGS. 1-5. Method 600 can begin with step 604 in which the media server 530 can receive media content for distribution to media devices. In one embodiment, the media content can be received from a super headend office server. In one embodiment, the media content can be broadcast content that is received by way of an over-the-air source such as radio-frequency broadcasting or satellite broadcasting. In one embodiment, the media content is received from a wired source, such as a cable system. In one embodiment, the media content can be video-on-demand programming, such as movies, special events, or television episodes that are recorded and stored at the communication system 100 and then accessed by the media server 530.

In step 608, the media server 530 can divide the received media content in to media content segments. In one embodiment, the media server 530 can divide the media content into media content segments of standard time periods. In one embodiment, the media server 530 can divide the media content according to content type, where each segment includes content of a single type. In one embodiment, the media server 530 can forgo dividing the media content and analyze the media content in its entirety.

In step 612, the media server 530 can determine content weights for each of the media content segments. In one embodiment, the content weights correspond to levels of relative information change within each media content segment. In one embodiment, a fixed number of content weights can be used to characterize the relative level of information change in a media content segment. For example, three levels of content weights may be defined as low, medium, and high. For example, a media segment featuring mainly a talking head and largely an unmoving background—such as in a newscast—can be graded by the media server 530 as a low content weight. In another example, a segment featuring a slow motion video image can similarly be determined to be a low content weight segment by the media server 530. By contrast, a video segment of a true-speed sporting event can be determined to be a high weight content segment.

In one embodiment, the media server 530 can use a motion estimation process to determine the content weight of media segments. For example, the media server 530 can determine a series of motion vectors for adjacent frames in a sequence of frames in a media segment. The motion vectors can describe transformational movements of objects in adjacent video frames as, for example, one frame image moves with respect to a first location at a first frame and a second location at a second, adjacent frame. Motion estimation can be combined with motion compensation as part of a process to compress the video media content. However, the media server 530 can calculate motion vectors for adjacent video frames and use the magnitude, or a statistic based from the magnitude, to represent a measure of the relative level of information change occurring in the media content images in the media segment.

In step 616, the media server 530 can detect if the media device 516A, 516B, or 506 has a media delivery policy. In one embodiment, the media device can have a media delivery policy that specifies a bit rate to be used for the delivery of streamed media content to the media device. For example, a mobile communication device 516B can specify a maximum bit rate that the device 516B can reliably receive and reproduce at its display. In another example, the mobile communication device 516B can specify a preferred bit rate for streamed content. In one embodiment, the media server 530 establishes and maintains delivery policies.

In step 620, if the media device 516A, 516B, or 506 has a media delivery policy, then the media server 530 can set bit rates for encoding the media content segments according to the media policy. In one embodiment, the media policy can specify that the media server 530 will always deliver media content to the media device 516A according to the slowest typical bit rate or always according to the fastest typical bit rate. For example, a service plan for a media device 516A could specify low cost streaming of media content. In such a plan, the media server 530 can send low content weighted video segments at the lowest possible bit rate while sending high content weighted video segments at only a medium bit rate to save system resources. In a different service plan, the media server 530 can stream media content to a media device 506 at the highest required bit rate for the content weight. In this case, if the media server 530 determines that a high content weight is needed for a media content segment, such as a segment from an action film, then the media server 530 will stream the content even if this taxes system resources.

In step 624, the media server can detect a change in a service level for the media device 516A. In one example, the media device 516A can request a change in service by submitting a request through a portal 302. In one embodiment, a higher level of service can be purchased by the user of a media device 516A. Conversely, the user of the media device 516B could choose to reduce the service level. In step 628, if there is a change in the service level for the media device 516A, 516B, or 506, then the media server 530 can adjust the media delivery policy for the media device 516A, 516B, or 506 according to the change in the service level.

In step 632, the media server 530 can encode the media content segments at bit rates according to the determined content weights for the media content segments. In one embodiment, the media server 530 can encode the media content segments, where each of the media content segments is encoded at a bit rate according to the content weight for that media content segment. The media server 530 can transmit the encoded media content segments as one or more data streams to media devices by way of an IMS network 250, where the media devices can include media processors 506 and mobile communication devices 516A and 516B. In one embodiment, the encoding can be performed by the media server 530 by applying different levels of digital compression to different media segments according to the content weights of those segments. In one embodiment, the encoding can be performed by the media server 530 by applying different display pixel resolutions to different segments of the at least a portion of the plurality of media content segments.

In step 636, the media server 530 can transmit a data stream of encoded media content segments to the media device 516A, 516B, or 506 at the encoded bit rates. In step 640, the media server 530 can switch the data stream of encoded media content segments between data channels according to the encoded bit rates. The media server 530 and/or the IMS network 250 and/or mobility networks 517A and 517B can switch data streams between data channels within the data links 560A-C based on the encoded bit rate of the data stream. In one embodiment, individual data channels within the data links, such as within data link 560A, have different bandwidth capability. In another embodiment, individual data channels will experience different bandwidth loading as the data channels are used to communication information for several different devices, such as where the IMS network 250 is communicating with several different devices through the data link 560A and the mobility network A 517A.

As the media server 530 encodes requested media content at various bit rates at different segments of the media content in response to variations in the media content weight, this streamed media content from the media server can exhibit corresponding changes in bit rate. For example, during an action sequence of a media program, the media server 530 may detect a high content weight in a segment of the media program—indicating a large amount of variation in video image—and, in response, encode the media content at a high bit rate or, alternatively, a low compression rate. The media server 530 can then stream this encoded media segment at a high bit rate to the receiving device, such as the mobile communications device 516A, over the data link 560A and mobility network A 517A.

In step 644, the media server 530 can determine if there are multiple encoded media content items. In one embodiment, the media server 530 can receive multiple items of content for distribution to the multiple media devices 516A, 516B, and 506. For example, each of the media devices 516A, 516B, and 506 can request different media programs or movies from the communication system 100. The media server 530 can then receive each of the requested media content programs from a media source 550, determine content weights for each of the content segments of these programs, and encode each of these content segments according to the content weights.

In step 648, if there are multiple encoded media content items, then the media server 530 can transmit the multiple data streams of the encoded media content items to the media devices 516A, 516B, or 506 at the encoded bit rates. In step 652, the media server 530 can switch the multiple data streams of encoded media content segments between data channels according to the encoded bit rates. Some of the data channels of the data link 560A and/or the mobility network A 517A can be capable of carrying the high bit rate stream of the encoded segment due to higher inherent bandwidth or due to lower temporal loading conditions, while other data channels of the data link 560A and/or the mobility network A 517A can be incapable of carrying the high bit rate segment. The media server 530 and/or IMS Network 250 and/or the mobility network A 517A can switch the high bit rate data stream between data channels of to compensate for loading conditions and/or inherent data channel limitations.

Upon reviewing the aforementioned embodiments, it would be evident to an artisan with ordinary skill in the art that said embodiments can be modified, reduced, or enhanced without departing from the scope and spirit of the claims described below. For example, in one embodiment, a media device 516A can store a delivery policy as a configuration and transmit the policy details to a media server 530 upon request. In another embodiment, a user of the media device 516A can select or configure elements of a delivery policy into the device. In another embodiment, a media server 530 and/or another element of the communication system 100 can store delivery policy information for each device that has permission to receive media content from the media server 530.

In one embodiment, a regular service plan would allow a media device 516B to receive content streams at low and medium bit rates, while a premium service plan would allow streaming at low, medium, or high rates. In one embodiment, the media server 530 can set the encoding bit rates as requested by the media device 516A, 516B, or 506. Other embodiments are contemplated by the subject disclosure.

Figure 7:
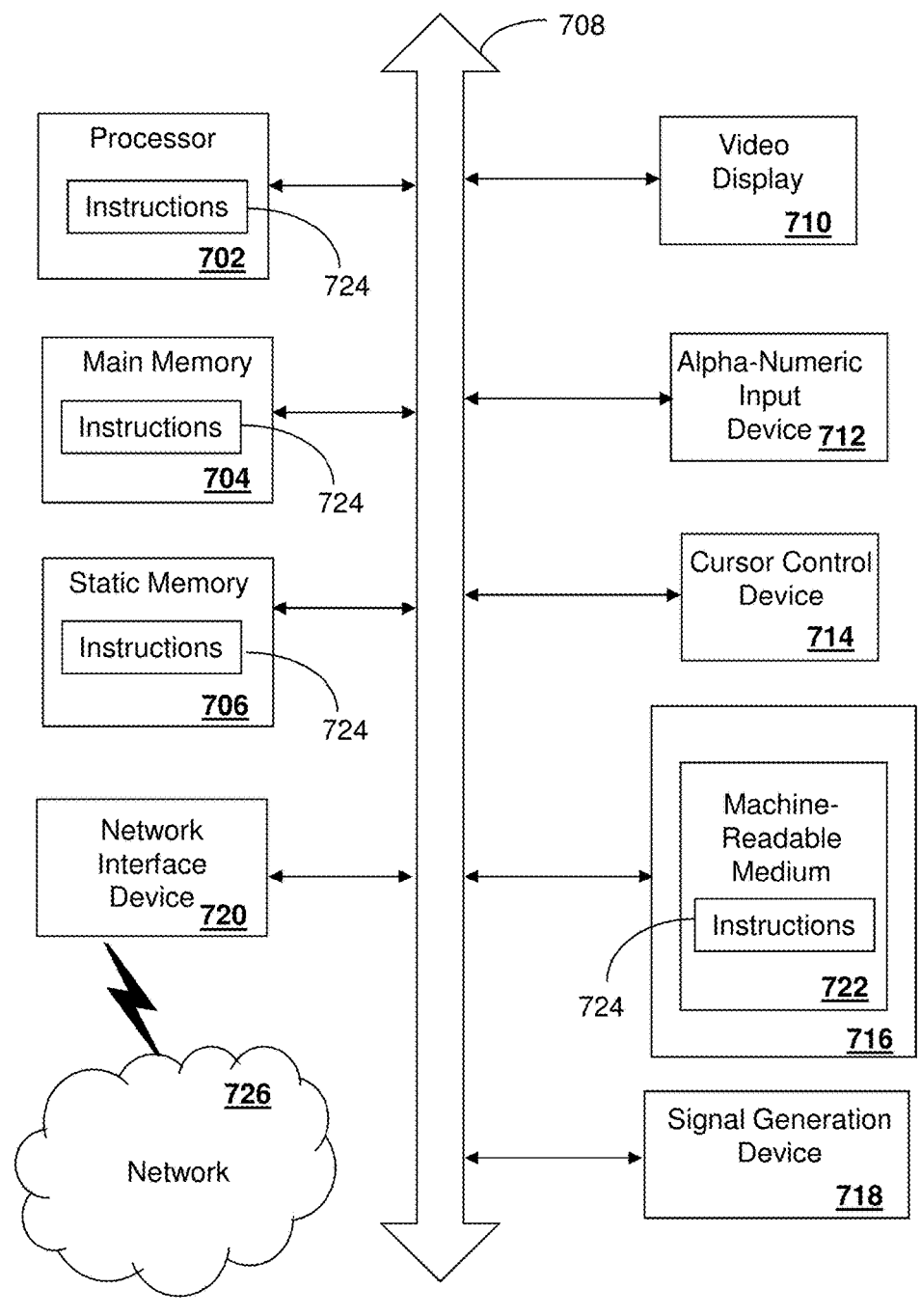
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the media server 130, the media processor 106, and/or the mobile communication device 516, and/or other devices of FIGS. 1-5. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system comprising a processor; and
a memory that stores executable instructions that, when executed by the processing system, facilitate performance of operations, comprising:
   receiving media content for distribution to a media device;
   determining a media delivery policy associated with the media device, wherein the media delivery policy prescribes a maximum encoded bit rate for the media content that is delivered to the media device, the maximum encoded bit rate based on an operational capability of the media device, wherein the media delivery policy is stored at the media device as a configuration of the media device, and wherein details of the media delivery policy are transmitted to a media server responsive to a request from the media server;
   determining a first content weight for the media content by motion estimation between first video frames of the media content, wherein the first content weight corresponds to a first level of information change within the media content;
   determining a first bit rate for the media content according to the first content weight for the media content, the prescribed maximum encoded bit rate and a display capability of the media device;
   selecting a first data channel of a link to the media device that supports the first bit rate;
   transmitting, to the media device via the first data channel, a first data stream associated with the media content and encoded at the first bit rate;
   determining a second content weight for the media content by motion estimation between second video frames of the media content, wherein the second content weight corresponds to a second level of information change within the media content;
   selecting a second data channel of the link to the media device that supports a second bit rate, the second bit rate based on the second content weight and the display capability of the media device; and
   transmitting, to the media device via the second data channel, a second data stream encoded at the second bit rate.

2. The device of claim 1, wherein the operations further comprise:
   determining a third bit rate for second media content according to a third content weight for the second media content; and
   encoding the second media content at the third bit rate to generate a third data stream for the second media content.

3. The device of claim 1, wherein the content weight comprises a first parameter indicative of a high level of information change, a second parameter indicative of a mid-level of information change, a third parameter indicative of a low level of information change, or any combination thereof.

4. The device of claim 1, wherein
   the media delivery policy specifies a preferred encoded bit rate for the media content that is delivered to the media device;
   adapting the first bit rate for the media content according to the preferred encoded bit rate to generate an adapted bit rate for the media content; and
   encoding a plurality of media content segments according to the adapted bit rate to generate the data stream for the media content.

5. The device of claim 4, wherein the media delivery policy of the media device is determined according to a service level associated with the media device.

6. The device of claim 4, wherein the media delivery policy of the media device is determined according to one of a present location of the media device, a media content type associated with the media content for distribution to the media device, or combinations thereof.

7. The device of claim 1, wherein the operations further comprise switching from the first data channel to the second data channel according to an available bandwidth at the second data channel.

8. The device of claim 1, wherein the operations further comprise receiving from the media device a request for a fixed bit rate for the first data stream, wherein the encoding of the media content is performed according to the fixed bit rate.

9. The device of claim 1, wherein the encoding of the media content at the first bit rate is performed by applying digital compression to the media content according to the first bit rate.

10. The device of claim 1, wherein the encoding of the media content at the first bit rate is performed by applying a display pixel resolution to the media content according to the first bit rate.

11. The device of claim 1, wherein the first level of information change is based on a group of objects in adjacent frames in a series of frames of the media content.

12. The device of claim 11, wherein the first level of information change is further based on a series of motion vectors for the adjacent frames, wherein the motion vectors describe movement of the group of objects.

13. A method, comprising:
receiving, by a processing system including a processor, media content for distribution to a media device;
determining, by the processing system, a media delivery policy associated with the media device, wherein the media delivery policy prescribes a maximum encoded bit rate for the media content that is delivered to the media device, the maximum encoded bit rate based on an operational capability of the media device, wherein the media delivery policy is stored at the media device as a configuration of the media device, and wherein details of the media delivery policy are transmitted to a media server responsive to a request from the media server;
determining, by the processing system, a first content weight for the media content by motion estimation between first video frames of the media content, wherein the first content weight corresponds to a first level of information change within the media content;
determining, by the processing system, a first bit rate for the media content according to the first content weight for the media content, the prescribed maximum encoded bit rate and a display capability of the media device;
selecting, by the processing system, a first data channel of a link to the media device that supports the first bit rate;
transmitting, by the processing system to the media device via the first data channel, a first data stream associated with the media content and encoded at the first bit rate;
determining, by the processing system, a second content weight for the media content by motion estimation between second video frames of the media content, wherein the second content weight corresponds to a second level of information change within the media content;
selecting, by the processing system, a second data channel of the link to the media device that supports a second bit rate, the second bit rate based on the second content weight and the display capability of the media device; and
switching, by the processing system, from the first data channel to the second data channel according to an available bandwidth at the second data channel; and
transmitting, by the processing system to the media device via the second data channel, a second data stream responsive to the switching, the second data stream encoded at the second bit rate.

14. The method of claim 13, further comprising:
determining, by the processing system, the second bit rate for second media content according to second content weight for the second media content; and
encoding, by the processing system, the second media content at the second bit rate to generate the second data stream for the second media content.

15. The method of claim 13, further comprising:
wherein the media delivery policy specifies a preferred encoded bit rate for the media content that is delivered to the media device;
adapting, by the processing system, the bit rate for the media content according to the preferred encoded bit rate to generate an adapted bit rate for the media content; and
encoding, by the processing system, the media content according to the bit rate that is adapted to generate the data stream for the media content.

16. The method of claim 15, wherein the media delivery policy of the media device is determined according to a service level associated with the media device.

17. The method of claim 15, wherein the media delivery policy of the media device is determined according to one of a present location of the media device, a media content type associated with the media content for distribution to the media device, or combinations thereof.

18. A non-transitory, machine-readable storage medium, comprising executable instructions that, when executed by a processing system including a processor, facilitate performance of operations, comprising:
receiving, by the processing system, media content for distribution to a media device;
determining, by the processing system, a media delivery policy associated with the media device, wherein the media delivery policy prescribes a maximum encoded bit rate for the media content that is delivered to the media device, the maximum encoded bit rate based on an operational capability of the media device, wherein the media delivery policy is stored at the media device as a configuration of the media device, and wherein details of the media delivery policy are transmitted to a media server responsive to a request from the media server;
determining, by the processing system, a first content weight for the media content by motion estimation between first video frames of the media content;
determining, by the processing system, a first bit rate for the media content according to the first content weight for the media content, the prescribed maximum encoded bit rate and a display capability of the media device;
transmitting, by the processing system, to the media device via a first data channel that supports the first bit rate, a first data stream associated with the media content and encoded at the first bit rate;
determining, by the processing system, a second content weight for the media content by motion estimation between second video frames of the media content, wherein the second content weight corresponds to a second level of information change within the media content; and
transmitting, by the processing system, to the media device via a second data channel, a second data stream encoded at a second bit rate based on the second content weight and the display capability of the media device, wherein the second data channel is selected to support the second bit rate,
wherein both the first data channel and the second data channel correspond to a single link.

19. The non-transitory, machine-readable storage medium of claim 18 wherein the content weight corresponds to a level of information change within the media content.

20. The non-transitory, machine-readable storage medium of claim 18, wherein the media delivery policy of the media device is determined according to a service level associated with the media device.

* * * * *